US012804703B2

(12) United States Patent
Mackowiak et al.

(10) Patent No.: US 12,804,703 B2
(45) Date of Patent: Nov. 17, 2026

(54) CELL ACCESS BARRING

(71) Applicant: Nokia Technologies Oy, Espoo (FI)

(72) Inventors: Pawel Mackowiak, Cracow (PL); Krishnan Iyer, Dunwoody, GA (US)

(73) Assignee: Nokia Technologies Oy, Espoo (FI)

( * ) Notice: Subject to any disclaimer, the term of this patent is extended or adjusted under 35 U.S.C. 154(b) by 409 days.

(21) Appl. No.: 18/310,406

(22) Filed: May 1, 2023

(65) Prior Publication Data

US 2024/0015783 A1 Jan. 11, 2024

Related U.S. Application Data

(60) Provisional application No. 63/388,017, filed on Jul. 11, 2022.

(51) Int. Cl.
*H04W 74/00* (2009.01)

(52) U.S. Cl.
CPC .................................. *H04W 74/002* (2013.01)

(58) Field of Classification Search
CPC ............... H04W 74/002; H04W 48/06; H04W 48/12; H04W 48/02
See application file for complete search history.

(56) References Cited

U.S. PATENT DOCUMENTS 9,572,149 B1* 2/2017 Zhou ......................... H04L 5/00
2017/0135025 A1* 5/2017 Koskinen .............. H04W 48/02
2020/0374838 A1* 11/2020 Sha ................... H04W 74/0833
2021/0022107 A1* 1/2021 Kadiri .................... H04W 72/12
2021/0377832 A1* 12/2021 Wang ................ H04W 36/0033
2023/0370968 A1* 11/2023 Elshafie ............ H04W 52/0274

FOREIGN PATENT DOCUMENTS

EP 3525519 A1 * 8/2019 ........ H04W 74/0833
WO WO-2019030429 A1 * 2/2019 ............ H04W 48/06
WO WO-2021093141 A1 * 5/2021 ............ H04W 48/06
WO 2021/211033 A1 10/2021
WO WO-2021257856 A1 * 12/2021 .............. H04W 4/70

OTHER PUBLICATIONS

3GPP TSG-RAN WG2 Meeting #113e, CR on the Parameters Selection, Jan. 2-Feb. 5, 2021, p. 5 (Year: 2021).*
3GPP TSG-RAN WG2 Meeting #113e, CR on the Parameters Selection, Jan. 2-Feb. 5, 2021, p. 5 (Year: 2021) (Year: 2021).*

(Continued)

*Primary Examiner* — Brandon J Miller
(74) *Attorney, Agent, or Firm* — Barta Jones, PLLC

(57) ABSTRACT

The disclosure relates to an apparatus comprising at least one processor and at least one memory including computer code for one or more programs, the at least one memory and the computer code configured, with the at least one processor, to cause the apparatus at least to: determine that an access to a cell served by a base station is required; determine that an access barring requirement is met by the apparatus, wherein the access barring requirement is based at least in part on a radio frequency conditions threshold; and prevent the access to the cell.

11 Claims, 7 Drawing Sheets

(56) References Cited

OTHER PUBLICATIONS

ETSI TS 122 261 V16.15.0 (Nov. 2021) 5G; Service requirements for the 5G system (3GPP TS 22.261 version 16.15.0 Release 16, pp. 30-32 (Year: 2021).*
"3rd Generation Partnership Project; Technical Specification Group Radio Access Network; NR; Radio Resource Control (RRC) protocol specification (Release 17)", 3GPP TS 38.331, V17.0.0, Mar. 2022, pp. 1-1221.
"3rd Generation Partnership Project; Technical Specification Group Services and System Aspects; Service requirements for the 5G system; Stage 1 (Release 18)", 3GPP TS 22.261, V18.6.0, Mar. 2022, 114 pages.
"3rd Generation Partnership Project; Technical Specification Group Radio Access Network; Evolved Universal Terrestrial Radio Access (E-UTRA); Radio Resource Control (RRC); Protocol specification (Release 17)", 3GPP TS 36.331, V17.0.0, Mar. 2022, pp. 1-1119.
"3rd Generation Partnership Project; Technical Specification Group Services and System Aspects; System architecture for the 5G System (5GS); Stage 2 (Release 17)", 3GPP TS 23.501, V17.4.0, Mar. 2022, pp. 1-567.
"How LTE Stuff Works?", 5G NR: SIB1, Retrieved on May 9, 2023, Webpage available at : http://howltestuffworks.blogspot.com/2019/10/5g-nr-system-information-block-1-sib1.html.
Extended European Search Report received for corresponding European Patent Application No. 23177446.4, dated Nov. 22, 2023, 11 pages.
"Corrections to UE capabilities and SIB25", 3GPP TSG-RAN WG2 Meeting #112-e, R2-2008908, Lenovo, Nov. 2-13, 2020, 75 pages.
"Correction on uac-AC1-SelectAssistInfo", 3GPP TSG-RAN WG2 Meeting #112, R2-2011071, ZTE corporation, Nov. 2-13, 2020, 8 pages.

* cited by examiner

CELL ACCESS BARRING

RELATED APPLICATIONS

This application claims priority from U.S. Provisional Application No. 63/388,017, filed Jul. 11, 2022, which is hereby incorporated by reference in its entirety.

FIELD OF THE DISCLOSURE

The present disclosure relates to an apparatus, a method, and a computer program for managing access to a cell in a communication system.

BACKGROUND

A communication system can be seen as a facility that enables communication sessions between two or more entities such as communication devices, base stations and/or other nodes by providing carriers between the various entities involved in the communications path.

The communication system may be a wireless communication system. Examples of wireless systems comprise public land mobile networks (PLMN) operating based on radio standards such as those provided by 3GPP, satellite based communication systems and different wireless local networks, for example wireless local area networks (WLAN). The wireless systems can typically be divided into cells, and are therefore often referred to as cellular systems.

The communication system and associated devices typically operate in accordance with a given standard or specification which sets out what the various entities associated with the system are permitted to do and how that should be achieved. Communication protocols and/or parameters which shall be used for the connection are also typically defined. Examples of standard are the so-called 5G standards.

SUMMARY

According to an aspect there is provided an apparatus comprising means for: determining that an access to a cell served by a base station is required; determining that an access barring requirement is met by the apparatus, wherein the access barring requirement is based at least in part on a radio frequency conditions threshold; and preventing the access to the cell.

The access barring requirement may be met when a radio frequency conditions experienced by the apparatus on the cell is lower (i.e. worse) than the radio frequency conditions threshold.

The access barring requirement may not be met when a radio frequency conditions experienced by the apparatus on the cell is greater (i.e. better) than the radio frequency conditions threshold.

The apparatus may comprise means for: determining that an access barring requirement is not met by the apparatus; and allow the access to the cell.

The radio frequency conditions threshold is a reference signal received power threshold or a reference signal received quality threshold.

The reference signal received power threshold or the reference signal received quality threshold is distinct from a reference signal received power threshold or a reference signal received quality threshold for cell selection or reselection.

The reference signal received power threshold or the reference signal received quality threshold is greater than a reference signal received power threshold or a reference signal received quality threshold for cell selection or reselection.

The base station experiences congestion on a physical downlink control channel of the cell.

The apparatus belongs to an access category or access class and the access barring requirement is associated with the access category or access class.

The access barring category is comprised between 11 and 31.

The apparatus may comprise means for: receiving, from the base station, the radio frequency conditions threshold.

The apparatus may comprise means for: receive, from the base station, the radio frequency conditions threshold in a system information block.

The system information block is an SIB1, an SIB2 or an SIB25.

The system information block is an SIB1 when the base station serving the cell is a gNode B and is connected to a 5G core network.

The system information block is an SIB25 when the base station serving the cell is an eNode B and is connected to a 5G core network.

The radio frequency conditions threshold is defined at a unified access control barring configuration level.

The radio frequency conditions threshold may be defined in an 'uac-BarringInfo' information element.

The radio frequency conditions threshold is defined at a unified access control barring for common level.

The radio frequency conditions threshold may be defined in an 'uac-BarringForCommon' information element.

The radio frequency conditions threshold is defined at a unified access control barring per public land mobile network configuration level.

The radio frequency conditions threshold may be defined in an 'uac-BarringPerPLMN' information element.

The system information block is an SIB2 when the base station serving the cell is an eNode B and is connected to an evolved packet core network.

The radio frequency conditions threshold is defined at an access barring configuration level.

The radio frequency conditions threshold may be defined within an 'ac-BarringInfo' information element.

The radio conditions threshold is associated with a service.

The service may comprise an emergency service, mobile originating signaling service, mobile originating data service, multimedia telephony video service, short message system service or circuit switch fallback service.

The access to the cell may be a random access to the cell.

The apparatus may be a user equipment.

According to an aspect there is provided an apparatus comprising at least one processor and at least one memory including computer code for one or more programs, the at least one memory and the computer code configured, with the at least one processor, to cause the apparatus at least to: determine that an access to a cell served by a base station is required; determine that an access barring requirement is met by the apparatus, wherein the access barring requirement is based at least in part on a radio frequency conditions threshold; and prevent the access to the cell.

The access barring requirement may be met when a radio frequency conditions experienced by the apparatus on the cell is lower (i.e. worse) than the radio frequency conditions threshold.

The access barring requirement may not be met when a radio frequency conditions experienced by the apparatus on the cell is greater (i.e. better) than the radio frequency conditions threshold.

The at least one memory and the computer code may be configured, with the at least one processor, to cause the apparatus at least to: determine that an access barring requirement is not met by the apparatus; and allow the access to the cell.

The radio frequency conditions threshold is a reference signal received power threshold or a reference signal received quality threshold.

The reference signal received power threshold or the reference signal received quality threshold is distinct from a reference signal received power threshold or a reference signal received quality threshold for cell selection or reselection.

The reference signal received power threshold or the reference signal received quality threshold is greater than a reference signal received power threshold or a reference signal received quality threshold for cell selection or reselection.

The base station experiences congestion on a physical downlink control channel of the cell.

The apparatus belongs to an access category or access class and the access barring requirement is associated with the access category or access class.

The access barring category is comprised between 11 and 31.

The at least one memory and the computer code are configured, with the at least one processor, to cause the apparatus at least to: receive, from the base station, the radio frequency conditions threshold.

The at least one memory and the computer code are configured, with the at least one processor, to cause the apparatus at least to: receive, from the base station, the radio frequency conditions threshold in a system information block.

The system information block is an SIB1, an SIB2 or an SIB25.

The system information block is an SIB1 when the base station serving the cell is a gNode B and is connected to a 5G core network.

The system information block is an SIB25 when the base station serving the cell is an eNode B and is connected to a 5G core network.

The radio frequency conditions threshold is defined at a unified access control barring configuration level.

The radio frequency conditions threshold may be defined in an 'uac-BarringInfo' information element.

The radio frequency conditions threshold is defined at a unified access control barring for common level.

The radio frequency conditions threshold may be defined in an 'uac-BarringForCommon' information element.

The radio frequency conditions threshold is defined at a unified access control barring per public land mobile network configuration level.

The radio frequency conditions threshold may be defined in an 'uac-BarringPerPLMN' information element.

The system information block is an SIB2 when the base station serving the cell is an eNode B and is connected to an evolved packet core network.

The radio frequency conditions threshold is defined at an access barring configuration level.

The radio frequency conditions threshold may be defined within an 'ac-BarringInfo' information element.

The radio conditions threshold is associated with a service.

The service may comprise an emergency service, mobile originating signaling service, mobile originating data service, multimedia telephony video service, short message system service or circuit switch fallback service.

The access to the cell may be a random access to the cell.

The apparatus may be a user equipment.

According to an aspect there is provided an apparatus comprising circuitry configured to: determine that an access to a cell served by a base station is required; determine that an access barring requirement is met by the apparatus, wherein the access barring requirement is based at least in part on a radio frequency conditions threshold; and prevent the access to the cell.

The access barring requirement may be met when a radio frequency conditions experienced by the apparatus on the cell is lower (i.e. worse) than the radio frequency conditions threshold.

The access barring requirement may not be met when a radio frequency conditions experienced by the apparatus on the cell is greater (i.e. better) than the radio frequency conditions threshold.

The apparatus may comprise circuitry configured to: determine that an access barring requirement is not met by the apparatus; and allow the access to the cell.

The radio frequency conditions threshold is a reference signal received power threshold or a reference signal received quality threshold.

The reference signal received power threshold or the reference signal received quality threshold is distinct from a reference signal received power threshold or a reference signal received quality threshold for cell selection or reselection.

The reference signal received power threshold or the reference signal received quality threshold is greater than a reference signal received power threshold or a reference signal received quality threshold for cell selection or reselection.

The base station experiences congestion on a physical downlink control channel of the cell.

The apparatus belongs to an access category or access class and the access barring requirement is associated with the access category or access class.

The access barring category is comprised between 11 and 31.

The apparatus may comprise circuitry configured to: receive, from the base station, the radio frequency conditions threshold.

The apparatus may comprise circuitry configured to: receive, from the base station, the radio frequency conditions threshold in a system information block.

The system information block is an SIB1, an SIB2 or an SIB25.

The system information block is an SIB1 when the base station serving the cell is a gNode B and is connected to a 5G core network.

The system information block is an SIB25 when the base station serving the cell is an eNode B and is connected to a 5G core network.

The radio frequency conditions threshold is defined at a unified access control barring configuration level.

The radio frequency conditions threshold may be defined in an 'uac-BarringInfo' information element.

The radio frequency conditions threshold is defined at a unified access control barring for common level.

The radio frequency conditions threshold may be defined in an ‘uac-BarringForCommon’ information element.

The radio frequency conditions threshold is defined at a unified access control barring per public land mobile network configuration level.

25 The radio frequency conditions threshold may be defined in an ‘uac-BarringPerPLMN’ information element.

The system information block is an SIB2 when the base station serving the cell is an eNode B and is connected to an evolved packet core network.

The radio frequency conditions threshold is defined at an access barring configuration level.

The radio frequency conditions threshold may be defined within an ‘ac-BarringInfo’ information element.

The radio conditions threshold is associated with a service.

The service may comprise an emergency service, mobile originating signaling service, mobile originating data service, multimedia telephony video service, short message system service or circuit switch fallback service.

The access to the cell may be a random access to the cell.

The apparatus may be a user equipment.

According to an aspect there is provided a method comprising: determining that an access to a cell served by a base station is required; determining that an access barring requirement is met by an apparatus, wherein the access barring requirement is based at least in part on a radio frequency conditions threshold; and preventing the access to the cell.

The access barring requirement may be met when a radio frequency conditions experienced by the apparatus on the cell is lower (i.e. worse) than the radio frequency conditions threshold.

The access barring requirement may not be met when a radio frequency conditions experienced by the apparatus on the cell is greater (i.e. better) than the radio frequency conditions threshold.

The method may comprise: determining that an access barring requirement is not met by the apparatus; and allow the access to the cell.

The radio frequency conditions threshold is a reference signal received power threshold or a reference signal received quality threshold.

The reference signal received power threshold or the reference signal received quality threshold is distinct from a reference signal received power threshold or a reference signal received quality threshold for cell selection or reselection.

The reference signal received power threshold or the reference signal received quality threshold is greater than a reference signal received power threshold or a reference signal received quality threshold for cell selection or reselection.

The base station experiences congestion on a physical downlink control channel of the cell.

The apparatus belongs to an access category or access class and the access barring requirement is associated with the access category or access class.

The access barring category is comprised between 11 and 31.

The method may comprise: receiving, from the base station, the radio frequency conditions threshold.

The apparatus may comprise means for: receive, from the base station, the radio frequency conditions threshold in a system information block.

The system information block is an SIB1, an SIB2 or an SIB25.

The system information block is an SIB1 when the base station serving the cell is a gNode B and is connected to a 5G core network.

The system information block is an SIB25 when the base station serving the cell is an eNode B and is connected to a 5G core network.

The radio frequency conditions threshold is defined at a unified access control barring configuration level.

The radio frequency conditions threshold may be defined in an ‘uac-BarringInfo’ information element.

The radio frequency conditions threshold is defined at a unified access control barring for common level.

The radio frequency conditions threshold may be defined in an ‘uac-BarringForCommon’ information element.

The radio frequency conditions threshold is defined at a unified access control barring per public land mobile network configuration level.

The radio frequency conditions threshold may be defined in an ‘uac-BarringPerPLMN’ information element.

The system information block is an SIB2 when the base station serving the cell is an eNode B and is connected to an evolved packet core network.

The radio frequency conditions threshold is defined at an access barring configuration level.

The radio frequency conditions threshold may be defined within an ‘ac-BarringInfo’ information element.

The radio conditions threshold is associated with a service.

The service may comprise an emergency service, mobile originating signaling service, mobile originating data service, multimedia telephony video service, short message system service or circuit switch fallback service.

The access to the cell may be a random access to the cell.

The apparatus may be a user equipment.

According to an aspect there is provided a computer program comprising computer executable code which when run on at least one processor is configured to: determine that an access to a cell served by a base station is required; determine that an access barring requirement is met by an apparatus, wherein the access barring requirement is based at least in part on a radio frequency conditions threshold; and prevent the access to the cell.

The access barring requirement may be met when a radio frequency conditions experienced by the apparatus on the cell is lower (i.e. worse) than the radio frequency conditions threshold.

The access barring requirement may not be met when a radio frequency conditions experienced by the apparatus on the cell is greater (i.e. better) than the radio frequency conditions threshold.

The computer program may comprise computer executable code which when run on at least one processor is configured to: determine that an access barring requirement is not met by the apparatus; and allow the access to the cell.

The radio frequency conditions threshold is a reference signal received power threshold or a reference signal received quality threshold.

The reference signal received power threshold or the reference signal received quality threshold is distinct from a reference signal received power threshold or a reference signal received quality threshold for cell selection or reselection.

The reference signal received power threshold or the reference signal received quality threshold is greater than a reference signal received power threshold or a reference signal received quality threshold for cell selection or reselection.

The base station experiences congestion on a physical downlink control channel of the cell.

The apparatus belongs to an access category or access class and the access barring requirement is associated with the access category or access class.

The access barring category is comprised between 11 and 31.

The computer program may comprise computer executable code which when run on at least one processor is configured to: receive, from the base station, the radio frequency conditions threshold.

The computer program may comprise computer executable code which when run on at least one processor is configured to: receive, from the base station, the radio frequency conditions threshold in a system information block.

The system information block is an SIB1, an SIB2 or an SIB25.

The system information block is an SIB1 when the base station serving the cell is a gNode B and is connected to a 5G core network.

The system information block is an SIB25 when the base station serving the cell is an eNode B and is connected to a 5G core network.

The radio frequency conditions threshold is defined at a unified access control barring configuration level.

The radio frequency conditions threshold may be defined in an 'uac-BarringInfo' information element.

The radio frequency conditions threshold is defined at a unified access control barring for common level.

The radio frequency conditions threshold may be defined in an 'uac-BarringForCommon' information element.

The radio frequency conditions threshold is defined at a unified access control barring per public land mobile network configuration level.

The radio frequency conditions threshold may be defined in an 'uac-BarringPerPLMN' information element.

The system information block is an SIB2 when the base station serving the cell is an eNode B and is connected to an evolved packet core network.

The radio frequency conditions threshold is defined at an access barring configuration level.

The radio frequency conditions threshold may be defined within an 'ac-BarringInfo' information element.

The radio conditions threshold is associated with a service.

The service may comprise an emergency service, mobile originating signaling service, mobile originating data service, multimedia telephony video service, short message system service or circuit switch fallback service.

The access to the cell may be a random access to the cell.

The apparatus may be a user equipment.

According to an aspect there is provided an apparatus comprising means for: sending, to a user equipment, a radio frequency conditions threshold to allow the user equipment to determine that an access barring requirement is met by the user equipment, wherein the access barring requirement is based at least in part on the radio frequency conditions threshold.

The apparatus may comprise means for: determining that a physical downlink control channel of the cell experiences congestion; and in response to the determining, sending, to the user equipment, the radio frequency conditions threshold to allow the user equipment to determine that an access barring requirement is met by the user equipment, wherein the access barring requirement is based at least in part on the radio frequency conditions threshold.

According to an aspect there is provided an apparatus comprising at least one processor and at least one memory including computer code for one or more programs, the at least one memory and the computer code configured, with the at least one processor, to cause the apparatus at least to: send, to a user equipment, a radio frequency conditions threshold to allow the user equipment to determine that an access barring requirement is met by the user equipment, wherein the access barring requirement is based at least in part on the radio frequency conditions threshold.

The at least one memory and the computer code configured, with the at least one processor, to cause the apparatus at least to: determine that a physical downlink control channel of the cell experiences congestion; and in response to the determining, send, to the user equipment, the radio frequency conditions threshold to allow the user equipment to determine that an access barring requirement is met by the user equipment, wherein the access barring requirement is based at least in part on the radio frequency conditions threshold.

According to an aspect there is provided an apparatus comprising circuitry configured to: send, to a user equipment, a radio frequency conditions threshold to allow the user equipment to determine that an access barring requirement is met by the user equipment, wherein the access barring requirement is based at least in part on the radio frequency conditions threshold.

The apparatus may comprise circuitry configured to: determine that a physical downlink control channel of the cell experiences congestion; and in response to the determining, send, to the user equipment, the radio frequency conditions threshold to allow the user equipment to determine that an access barring requirement is met by the user equipment, wherein the access barring requirement is based at least in part on the radio frequency conditions threshold.

According to an aspect there is provided a method comprising: sending, to a user equipment, a radio frequency conditions threshold to allow the user equipment to determine that an access barring requirement is met by the user equipment, wherein the access barring requirement is based at least in part on the radio frequency conditions threshold.

The method may comprise: determining that a physical downlink control channel of the cell experiences congestion; and in response to the determining, sending, to the user equipment, the radio frequency conditions threshold to allow the user equipment to determine that an access barring requirement is met by the user equipment, wherein the access barring requirement is based at least in part on the radio frequency conditions threshold.

According to an aspect there is provided a computer program comprising computer executable code which when run on at least one processor is configured to: send, to a user equipment, a radio frequency conditions threshold to allow the user equipment to determine that an access barring requirement is met by the user equipment, wherein the access barring requirement is based at least in part on the radio frequency conditions threshold.

The computer program may comprise computer executable code which when run on at least one processor is configured to: determine that a physical downlink control channel of the cell experiences congestion; and in response to the determining, send, to the user equipment, the radio frequency conditions threshold to allow the user equipment to determine that an access barring requirement is met by the user equipment, wherein the access barring requirement is based at least in part on the radio frequency conditions threshold.

According to an aspect, there is provided a computer readable medium comprising program instructions stored thereon for performing at least one of the above methods.

According to an aspect, there is provided a non-transitory computer readable medium comprising program instructions stored thereon for performing at least one of the above methods.

According to an aspect, there is provided a non-volatile tangible memory medium comprising program instructions stored thereon for performing at least one of the above methods.

In the above, many different aspects have been described. It should be appreciated that further aspects may be provided by the combination of any two or more of the aspects described above.

Various other aspects are also described in the following detailed description and in the attached claims.

LIST OF ABBREVIATIONS

ACB: Access Class Barringt
AF: Application Function
AMF: Access and Mobility Management Function
API: Application Programming Interface
BS: Base Station
CU: Centralized Unit
DL: Downlink
DU: Distributed Unit
eMBB: enhanced Mobile Broadband
gNB: gNodeB
GSM: Global System for Mobile communication
HSS: Home Subscriber Server
IE: Information Element
IoT: Internet of Things
LTE: Long Term Evolution
MAC: Medium Access Control
MS: Mobile Station
MTC: Machine Type Communication
NEF: Network Exposure Function
NF: Network Function
NR: New radio
NRF: Network Repository Function
PDCCH: Physical Downlink Control Channel
PDU: Packet Data Unit
PLMN: Public Land Mobile Network
RAM: Random Access Memory
(R)AN: (Radio) Access Network
RF: Radio Frequency
ROM: Read Only Memory
RSRP: Reference Signal Received Power
RSRQ: Reference Signal Received Quality
SIB: System Information Block
SMF: Session Management Function
TR: Technical Report
TS: Technical Specification
UAC: Unified Access Control
UE: User Equipment
UMTS: Universal Mobile Telecommunication System
3GPP: 3$^{rd}$ Generation Partnership Project
5th Generation
5G Core network
5GS: 5G System

BRIEF DESCRIPTION OF THE FIGURES

Embodiments will now be described, by way of example only, with reference to the accompanying Figures in which.

DETAILED DESCRIPTION

In the following certain embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIGS. 1, 2 and 3 to assist in understanding the technology underlying the described examples.

Figure 1:
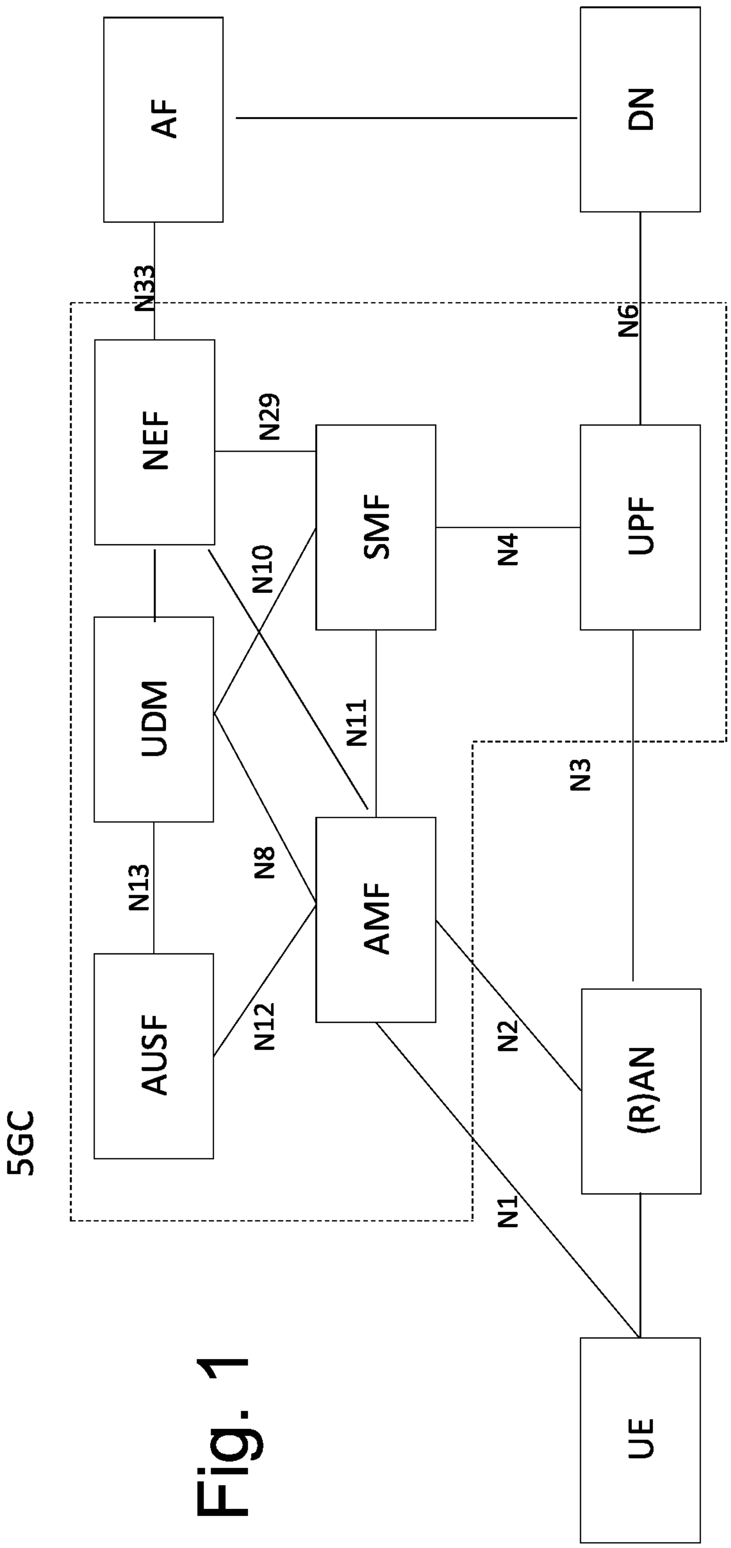
FIG. 1 shows a schematic representation of a 5G system.

FIG. 1 shows a schematic representation of a 5G system (5GS). The 5GS may comprises a user equipment (UE), a (radio) access network ((R)AN), a 5G core network (5GC), one or more application functions (AF) and one or more data networks (DN).

The 5G (R)AN may comprise one or more gNodeB (gNB) distributed unit functions connected to one or more gNodeB (gNB) centralized unit functions.

The 5GC may comprise an access and mobility management function (AMF), a session management function (SMF), an authentication server function (AUSF), a user data management (UDM), a user plane function (UPF) and/or a network exposure function (NEF).

Figure 2:
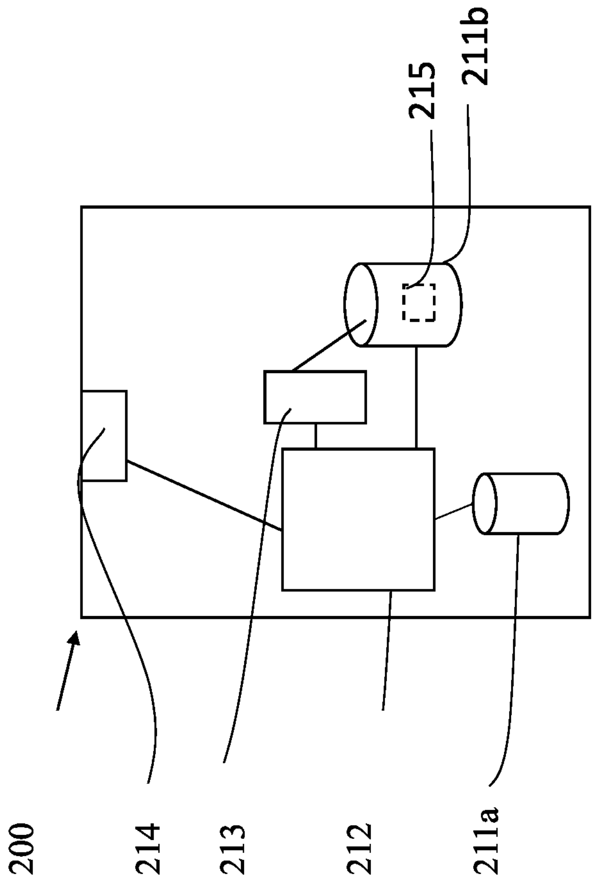
FIG. 2 shows a schematic representation of a control apparatus.

FIG. 2 illustrates an example of a control apparatus 200 for controlling a function of the (R)AN or the 5GC as illustrated on FIG. 1. The control apparatus may comprise at least one random access memory (RAM) 211*a*, at least on read only memory (ROM) 211*b*, at least one processor 212, 213 and an input/output interface 214. The at least one processor 212, 213 may be coupled to the RAM 211*a* and the ROM 211*b*. The at least one processor 212, 213 may be configured to execute an appropriate software code 215. The software code 215 may for example allow to perform one or more steps to perform one or more of the present aspects. The software code 215 may be stored in the ROM 211*b*. The control apparatus 200 may be interconnected with another control apparatus 200 controlling another function of the 5G (R)AN or the 5GC. In some embodiments, each function of the (R)AN or the 5GC comprises a control apparatus 200. In alternative embodiments, two or more functions of the (R)AN or the may share a control apparatus.

Figure 3:
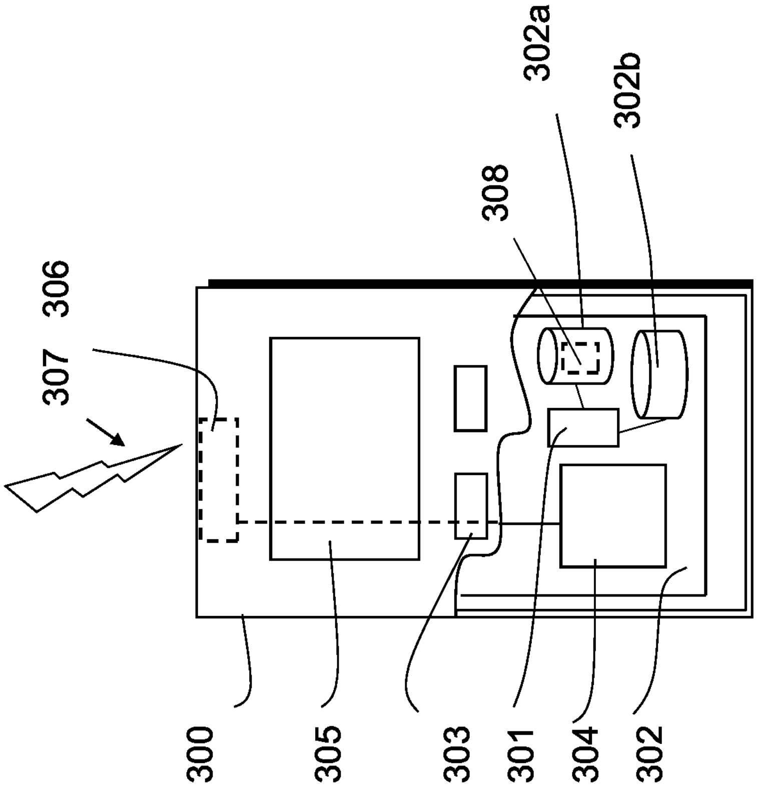
FIG. 3 shows a schematic representation of a user equipment.

FIG. 3 illustrates an example of a UE 300, such as the UE illustrated on FIG. 1. The UE 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, a Cellular Internet of things (CIoT) device or any combinations of these or the like. The UE 300 may provide, for example, communication of data for carrying communications. The communications may be one or more of voice, electronic mail (email), text message, multimedia, data, machine data and so on.

The UE 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The UE 300 may be provided with at least one processor 301, at least one memory ROM 302*a*, at least one RAM 302*b* and other possible components 303 for use in software and hardware aided execution of tasks it is designed to perform, including control of access to and communications with access systems and other communication devices. The at least one processor 301 is coupled to the RAM 302*b* and the ROM 302*a*. The at least one processor 301 may be configured to execute an appropriate software code 308. The software code 308 may for example allow to perform one or more of the present aspects. The software code 308 may be stored in the ROM 302*a*.

The processor, storage and other relevant control apparatus can be provided on an appropriate circuit board and/or in chipsets. This feature is denoted by reference 304. The device may optionally have a user interface such as keypad 305, touch sensitive screen or pad, combinations thereof or the like. Optionally one or more of a display, a speaker and a microphone may be provided depending on the type of the device.

In most customers networks across the globe LTE systems are deployed and carry significant amount of LTE traffic. Subsequent to the completion of 5G enhanced mobile broadband (eMBB) standards with 3GPP Rel15, there has been an uptick in 5G traffic in Korea and the United-States markets. While it is important to address the insatiable demand from consumers for data, it is also equally important to ensure that the user has an enriched experience.

One of the major physical layer bottlenecks may be physical downlink control channel (PDCCH). PDCCH carries DL and UL control information that may be essential for UE to establish UL and DL transfers. It may be critical to ensure high decoding reliability of PDCCH across a cell for a UE regardless whether the UE experiences good or poor radio frequency (RF) conditions within a cell. A scheduler may use more PDCCH resources a to relay the DL and UL control information for a UE experiencing poor RF conditions on the cell (e.g. UE at the edge of the cell) and less PDCCH resources to relay the DL and UL control information for a UE experiencing good RF conditions on the cell (e.g. UE at the centre of the cell). Using more PDCCH resources allows more repetition of the DL and UL control information thereby a more reliable decoding of the DL and UL control information.

Serving a UE experiencing poor RF conditions on the cell (e.g. UE at the edge of the cell) when the cell experiences PDCCH congestion may be problematic and may have a cascading effect. The PDCCH congestion may result in more retransmissions of user plane traffic, which in turn may result in more PDCCH resources being used to give higher priority grants for retransmissions of user plane traffic and in the PDCCH congestion being aggravated.

When a cell experiences PDCCH congestion, load balancing may be implemented. A UE may be handed over from the cell experiencing PDCCH congestion to another cell users experiencing less PDCCH congestion. However, load balancing may not be sufficient and there may be a need to take proactive measures to prevent a UE experiencing poor RF conditions on the cell (e.g. UE at the edge of the cell) from trying to access the cell to conserve PDCCH resources to serve another UE experiencing good RF conditions on the cell. In this way, maximize the overall cell capacity may be maximized and user experience in the cell may be improved.

In this disclosure the term "access" may refer to a "random access". A UE may attempt to access a cell subsequent to (re)selecting the cell.

Mechanisms like access class barring (ACB) for LTE and unified access control (UAC) for 5G have been proposed to prevent a UE from accessing a cell. A challenge with ACB and UAC is that they prevent a UE from accessing a cell regardless whether the UE experiences poor RF conditions on the cell (e.g. UE at the edge of the cell) or good RF conditions on the cell (e.g. UE at the centre of the cell). Preventing a UE from accessing a cell when the UE experiences good RF conditions on the cell (e.g. UE at the centre of the cell) may not necessarily significantly contribute to the PDCCH congestion on the cell.

One or more aspect of this disclosure provide a mechanism to reduce PDCCH congestion within a cell. An access barring requirement may be based on RF conditions at a UE within a cell. A UE experiencing poor RF conditions on the cell (e.g. UE at the edge of the cell) may be prevented from accessing the cell. A UE experiencing good RF conditions on the cell (e.g. UE at the centre of the cell) may be allowed to access the cell. The access barring requirement may be based on RF conditions experienced by the UE on the cell being lower than a RF conditions threshold. The RF conditions threshold may be a reference signal received power (RSRP) threshold or a (reference signal received quality) RSRQ threshold. The RF conditions threshold may be different from the RF conditions threshold cell (re)selection. The RF conditions threshold may be greater than the RF conditions threshold cell (re)selection. The RF conditions threshold cell (re)selection may not be impacted so that a UE experiencing poor RF conditions on the cell (e.g. UE at the edge of the cell) and prevented from accessing the cell may still (re)select the cell.

One or more aspect of this disclosure provide a mechanism to promote access to a cell from a UE using a certain PLMN and/or having a certain access identity with access category when the BS serving the cell experiencing PDCCH congestion is an eNB connected to the 5GC or a gNB connected to the 5GC.

One or more aspect of this disclosure provide a mechanism to promote access to a cell from a UE using a certain PLMN and/or having a certain access identity with access class when the BS serving the cell experiencing PDCCH congestion is an eNB connected to the EPC.

When the cell experiences PDCCH congestion, the BS serving the cell may send the RF conditions threshold to the UE. For example an SIB may define the RF conditions threshold. When the cell does not experience PDCCH congestion, the BS serving the cell may not send the RF conditions threshold to the UE. For example an SIB may not define the RF conditions threshold.

The RF conditions threshold may be adjusted based on the severity of the PDCCH congestion and/or access barring strategy implemented by an operator.

Figure 4:
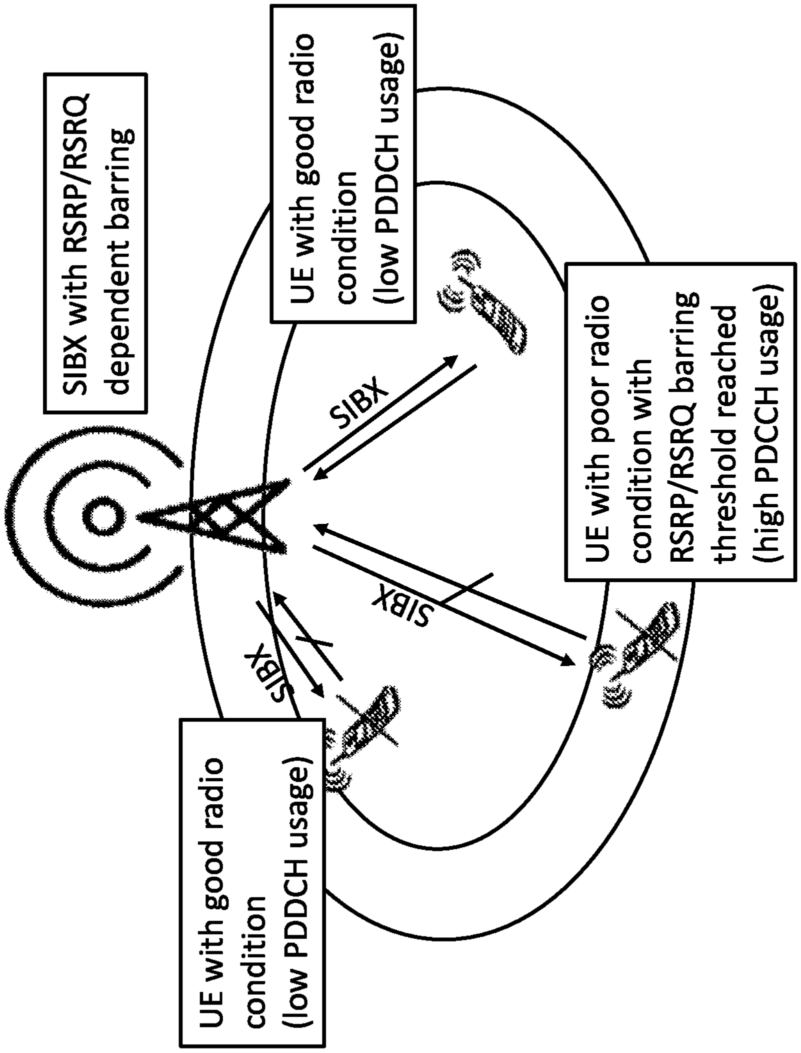
FIG. 4 shows a schematic representation of a (radio) access network comprising a base station and user equipment with different radio frequency conditions.

FIG. 4 shows a schematic representation of a (R)AN comprising a BS and user equipment with different radio frequency conditions. One UE is located at the edge of a cell served by the BS and may experience poor RF conditions on the cell. The UE may contribute more to PDCCH congestion on the cell. Two UEs are located closer to the centre of the cell served by the BS and may experience good RF conditions on the cell. The two UEs may contribute less to PDCCH congestion on the cell.

In an implementation, the BS serving the cell experiencing PDCCH congestion may be an eNB connected to the 5GC. Alternatively, the BS may be a gNB connected to the 5GC.

The UE may be belong to an access category. The access category may be associated with an access barring requirement. The access barring requirement may be based at least in part on a RF conditions threshold. The access barring requirement may be met when RF conditions experienced by the UE on the cell are lower than the RF conditions threshold. The RF conditions threshold may be a RSRP threshold or a RSRQ threshold. The RF conditions threshold may be different from another RF conditions threshold for cell (re)selection. The RF conditions threshold may be greater than the another RF conditions threshold for cell (re)selection.

The BS may send an indication of the RF threshold to the UE. The BS may send an indication of the RF conditions threshold to the UE in a SIB, for example in an SIB25 when the BS is an eNB connected to the 5GC or in an SIB1 when the BS is a gNB connected to the 5GC.

The RF conditions threshold may be defined at a UAC barring configuration level. The RF conditions threshold may be defined in an 'uac-BarringInfo' IE. The 'uac-BarringInfo' IE may be defined by 3GPP in TS 38.331 as follows.

The RF conditions threshold may be defined at an UAC barring for common level. The RF conditions threshold may be defined in an 'uac-BarringForCommon' IE.

The RF conditions threshold may be defined at an UAC barring per public land mobile network (PLMN) configuration level. The RF conditions threshold may be defined in an 'uac-BarringPerPLMN' IE.

```
uac-BarringInfo                              SEQUENCE {
   uac-BarringForCommon                          UAC-BarringPerCatList          OPTIONAL, --
Need S
   uac-BarringPerPLMN-List                         UAC-BarringPerPLMN-List        OPTIONAL, --
Need S
   uac-BarringInfoSetList                       UAC-BarringInfoSetList,
   uac-AccessCategory1-Selection AssistanceInfo         CHOICE {
      plmnCommon                               UAC-AccessCategory1-SelectionAssistanceInfo,
      individualPLMNList                          SEQUENCE (SIZE (2..maxPLMN)) OF UAC-
AccessCategory1-SelectionAssistanceInfo
      }
   OPTIONAL, -- Need S
      uac-RfThreshold                                 SEQUENCE {
         rsrp-UacThreshold                          RSRP-Range               OPTIONAL,
         rsrq-UacThreshold                          RSRQ-Range               OPTIONAL,
   }                                         OPTIONAL -- Need S
}
```

The access category may be one of the access categories comprised between 11 and 31 reserved by 3GPP. The access categories comprised between 11 and 31 may be associated with the same access barring requirements than the access categories comprised between 0 and 10 with the additional requirement that the RF conditions threshold is met. The access categories comprised between 11 and 31 may be defined by 3GPP in TS 22.261 as follows. The below table is an example and the mapping between access category numbers and conditions related to UE may be different in other example embodiments. Also, number of conditions related to UE may be different in other example embodiments.

| Access Category number | Conditions related to UE | Type of access attempt |
|---|---|---|
| 0 | All | MO signalling resulting from paging |
| 1 (NOTE 1) | UE is configured for delay tolerant service and subject to access control for Access Category 1, which is judged based on relation of UE's HPLMN and the selected PLMN. | All except for Emergency, or MO exception data |
| 2 | All | Emergency |
| 3 | All except for the conditions in Access Category 1. | MO signalling on NAS level resulting from other than paging |

-continued

| Access Category number | Conditions related to UE | Type of access attempt |
|---|---|---|
| 4 | All except for the conditions in Access Category 1. | MMTEL voice (NOTE 3) |
| 5 | All except for the conditions in Access Category 1. | MMTEL video |
| 6 | All except for the conditions in Access Category 1. | SMS |
| 7 | All except for the conditions in Access Category 1. | MO data that do not belong to any other Access Categories (NOTE 4) |
| 8 | All except for the conditions in Access Category 1 | MO signalling on RRC level resulting from other than paging |
| 9 | All except for the conditions in Access Category 1 | MO IMS registration related signalling (NOTE 5) |
| 10 (NOTE 6) | All | MO exception data |
| 11 | All with RSRP/RSRQ threshold met | MO signalling resulting from paging |
| 12 | UE with RSRP/RSRQ threshold met and configured for delay tolerant service and subject to access control for Access Category 1, which is judged based on relation of UE's HPLMN and the selected PLMN. | All except for Emergency, or MO exception data |
| 13 | All with RSRP/RSRQ threshold met | Emergency |
| 14 | All with RSRP/RSRQ threshold met except for the conditions in Access Category 1. | MO signalling on NAS level resulting from other than paging |
| 15 | All with RSRP/RSRQ threshold met except for the conditions in Access Category 1. | MMTEL voice (NOTE 3) |
| 16 | All with RSRP/RSRQ threshold met except for the conditions in Access Category 1. | MMTEL video |
| 17 | All with RSRP/RSRQ threshold met except for the conditions in Access Category 1. | SMS |
| 18 | All with RSRP/RSRQ threshold met except for the conditions in Access Category 1. | MO data that do not belong to any other Access Categories (NOTE 4) |
| 19 | All with RSRP/RSRQ threshold met except for the conditions in Access Category 1 | MO signalling on RRC level resulting from other than paging |
| 20 | All with RSRP/RSRQ threshold met except for the conditions in Access Category 1 | MO IMS registration related signalling (NOTE 5) |
| 21 | All with RSRP/RSRQ threshold met | MO exception data |
| ~~11-31~~ 22-31 | | Reserved standardized Access Categories |
| 32-63 (NOTE 2) | All | Based on operator classification |

NOTE 1:
The barring parameter for Access Category 1 is accompanied with information that define whether Access Category applies to UEs within one of the following categories: a) UEs that are configured for delay tolerant service; b) UEs that are configured for delay tolerant service and are neither in their HPLMN nor in a PLMN that is equivalent to it; c) UEs that are configured for delay tolerant service and are neither in the PLMN listed as most preferred PLMN of the country where the UE is roaming in the operator-defined PLMN selector list on the SIM/USIM, nor in their HPLMN nor in a PLMN that is equivalent to their HPLMN. When a UE is configured for EAB, the UE is also configured for delay tolerant service. In case a UE is configured both for EAB and for EAB override, when upper layer indicates to override Access Category 1, then Access Category 1 is not applicable.
NOTE 2:
When there are an Access Category based on operator classification and a standardized Access Category to both of which an access attempt can be categorized, and the standardized Access Category is neither 0 nor 2, the UE applies the Access Category based on operator classification. When there are an Access Category based on operator classification and a standardized Access Category to both of which an access attempt can be categorized, and the standardized Access Category is 0 or 2, the UE applies the standardized Access Category.
NOTE 3:
Includes Real-Time Text (RTT).
NOTE 4:
Includes IMS Messaging.
NOTE 5:
Includes IMS registration related signalling, e.g. IMS initial registration, re-registration, and subscription refresh.
NOTE 6:
Applies to access of a NB-IoT-capable UEto a NB-IOT cell connected to 5GC when the UE is authorized to send exception data.

In another implementation, the BS serving the cell experiencing PDCCH congestion may be an eNB connected to the EPC.

The UE may belong to an access class. The access class may be associated with an access barring requirement. The access barring requirement may be based at least in part on a RF conditions threshold. The access barring requirement may be met when RF conditions experienced by the UE on the cell are lower than the RF conditions threshold. The RF conditions threshold may be a RSRP threshold or a RSRQ threshold. The RF conditions threshold may be different from a RF conditions threshold for cell (re)selection. The RF conditions threshold may be greater than the RF conditions threshold for cell (re)selection.

The BS may send an indication of the RF conditions threshold to the UE in an SIB2.

The RF conditions threshold may associated with a service. The service may comprise an emergency service, mobile originating signaling service, mobile originating data service, multimedia telephony video service, short message system service or circuit switch fallback service.

The RF conditions threshold may be defined at an AC barring configuration level. The RF conditions threshold may be defined in an 'ac-Barring Info' IE. The 'ac-BarringInfo' IE may be defined by 3GPP in TS 36.331 as follows.

```
ac-BarringInfo                           SEQUENCE {
        ac-BarringForEmergency                  BOOLEAN,
        ac-BarringForMO-Signalling              AC-BarringConfig
    OPTIONAL,                           -- Need OP
        ac-BarringForMO-Data                    AC-BarringConfig
    OPTIONAL                          -- Need OP
    }
    OPTIONAL,                           -- Need OP
    [[  ssac-BarringForMMTEL-Voice-r9           AC-BarringConfig
    OPTIONAL,                           -- Need OP
        ssac-BarringForMMTEL-Video-r9             AC-BarringConfig
    OPTIONAL                          -- Need OP
    ]],
    [[  ac-BarringForCSFB-r10                   AC-BarringConfig
    OPTIONAL                          -- Need OP
    ]],
    [[  ac-BarringSkipForMMTELVoice-r12           ENUMERATED {true}
    OPTIONAL,                           -- Need OP
        ac-BarringSkipForMMTELVideo-r12           ENUMERATED {true}
    OPTIONAL,                           -- Need OP
        ac-BarringSkipForSMS-r12                ENUMERATED {true}
    OPTIONAL,                           -- Need OP
        ac-BarringPerPLMN-List-r12              AC-BarringPerPLMN-List-r12
    OPTIONAL                          -- Need OP
    ]],
        ac-RfThreshold                        SEQUENCE {
          rsrp-UacThreshold                 RSRP-Range              OPTIONAL,
          rsrq-UacThreshold                 RSRQ-Range              OPTIONAL,
          ac-ServiceId                            BIT STRING (SIZE (7))
                                  //1=Emergency, 2=MO-Signalling, 3=MO-Data, 4=MMTELVoice,
5=MMTELVideo, 6=SMS, 7=CSFB
  }                                    OPTIONAL -- Need OP
```

The RF conditions threshold may be defined at an AC barring per public land mobile network (PLMN) configuration level. The RF conditions threshold may be defined in an 'ac-BarringPerPLMN' IE.

Figure 5:
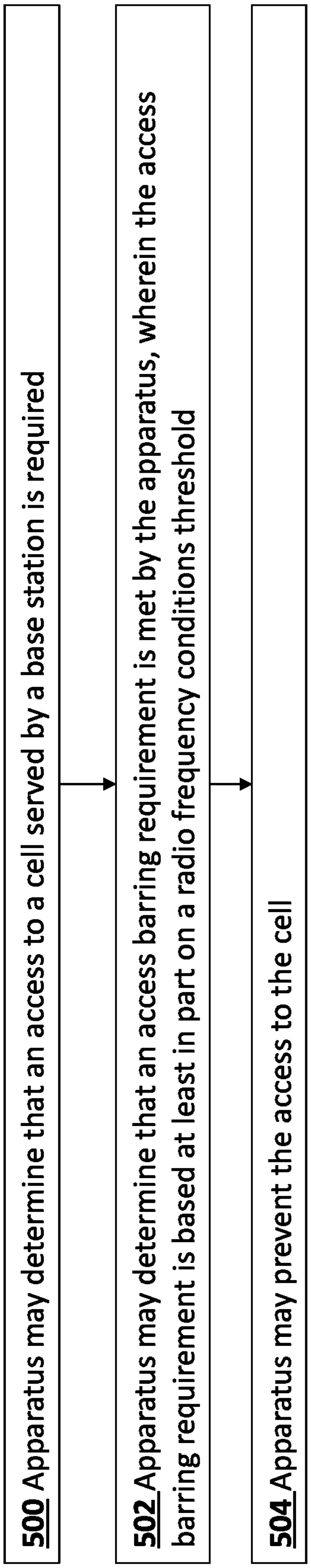
FIG. 5 shows a block diagram of a method for managing access to a cell in a communication system performed by an apparatus, for example a user equipment.

FIG. 5 shows a block diagram of a method for managing access to a cell in a communication system performed by an apparatus, such as a UE.

In step 500, the apparatus may determine that an access to a cell served by a BS is required.

In step 502, the apparatus may determine that an access barring requirement is met by the apparatus, wherein the access barring requirement is based at least in part on a RF conditions threshold.

In step 504, the apparatus may prevent the access to the cell.

The access barring requirement may be met when a RF conditions experienced by the apparatus on the cell is lower (i.e. worse) than the RF conditions threshold.

The access barring requirement may not be met when a RF conditions experienced by the apparatus on the cell is greater (i.e. better) than the RF conditions threshold.

The apparatus may determine that an access barring requirement is not met by the apparatus. The apparatus may allow the access to the cell.

The RF conditions threshold is a RSRP threshold or a RSRQ threshold.

The \rsrp threshold or the RSRQ threshold may be distinct from a RSRP threshold or a RSRQ threshold for cell selection or reselection.

The RSRP threshold or the RSRQ threshold may be greater than a RSRP threshold or a RSRQ threshold for cell selection or reselection.

The BS experiences congestion on a PDCCH of the cell.

The apparatus may belong to an access category or access class and the access barring requirement is associated with the access category or access class.

The access barring category may be comprised between 11 and 31.

The apparatus may receive, from the BS, the RF conditions threshold.

The apparatus may receive, from the BS, the RF conditions threshold in a SIB.

The SIB may be an SIB1, an SIB2 or an SIB25.

The SIB may be an SIB1 when the BS serving the cell is a gNode B and is connected to a 5GC.

The SIB may be an SIB25 when the BS serving the cell is an eNode B and may be connected to a 5GC.

The RF conditions threshold may be defined at a UAC barring configuration level.

The RF conditions threshold may be defined in an 'uac-BarringInfo' IE.

The RF conditions threshold may be defined at a UAC barring for common level.

The RF conditions threshold may be defined in an 'uac-BarringForCommon' IE.

The RF conditions threshold may be defined at a UAC barring per PLMN configuration level.

The RF threshold may be defined in an 'uac-BarringPerPLMN' IE.

The SIB may be an SIB2 when the base station serving the cell may be an eNode B and may be connected to an EPC.

The RF conditions threshold may be defined at an AC configuration level.

The RF conditions threshold may be defined within an 'ac-BarringInfo' IE.

The RF threshold may be associated with a service.

The service may comprise an emergency service, mobile originating signaling service, mobile originating data service, multimedia telephony video service, short message system service or circuit switch fallback service.

The access to the cell may be a random access to the cell.

Figure 6:
FIG. 6 shows a block diagram of a method for managing access to a cell in a communication system performed by an apparatus, for example a base station.

FIG. 6 shows a block diagram of a method for managing access to a cell in a communication system performed by an apparatus, for example a BS.

In step 600, the apparatus may send, to a UE, a RF conditions threshold to allow the UE to determine that an access barring requirement is met by the UE, wherein the access barring requirement is based at least in part on the RF conditions threshold.

The apparatus may determine that a PDCCH of the cell experiences congestion. In response to the determining, the apparatus may send, to the UE, the RF conditions threshold to allow the UE to determine that an access barring requirement is met by the UE, wherein the access barring requirement is based at least in part on the RF conditions threshold.

Figure 7:
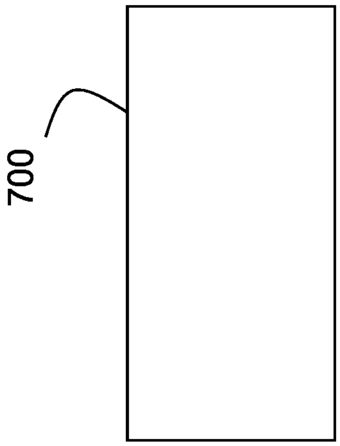
FIG. 7 shows a schematic representation of a non-volatile memory medium storing instructions which when executed by a processor allow a processor to perform one or more of the steps of the methods of FIGS. 5 and 6.

FIG. 7 shows a schematic representation of non-volatile memory media 700 storing instructions and/or parameters which when executed by a processor allow the processor to perform one or more of the steps of the methods of FIGS. 5 and 6.

It is noted that while the above describes example embodiments, there are several variations and modifications which may be made to the disclosed solution without departing from the scope of the present invention.

It will be understood that although the above concepts have been discussed in the context of a EPS and 5GS, one or more of these concepts may be applied to other cellular systems.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any procedures, e.g., as in FIGS. 5 and 6, may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Alternatively or additionally some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:

(a) hardware-only circuit implementations (such as implementations in only analogue and/or digital circuitry);

(b) combinations of hardware circuits and software, such as:

(i) a combination of analogue and/or digital hardware circuit(s) with software/firmware and (ii) any portions of hardware processor(s) with software (including digital signal processor(s)), software, and memory(ies) that work together to cause an apparatus, such as the communications device or base station to perform the various functions previously described; and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. A user equipment comprising at least one processor and at least one memory including computer code for one or more programs, the at least one memory and the computer code configured, with the at least one processor, to cause the user equipment at least to:

determine that an access by the user equipment to a cell served by a base station is required;

determine that an access barring requirement associated with an access category to which the user equipment belongs is met by the user equipment, wherein the access category is one of a plurality of access categories, and the plurality of access categories correspond to different types of access attempts, wherein determining that the access barring requirement is met comprises determining that a radio frequency condition experienced by the user equipment on the cell is lower than a radio frequency conditions threshold that is a condition related to the user equipment for the access category, and wherein the radio frequency conditions threshold is one of:

a reference signal received power (RSRP) threshold that is greater than a RSRP threshold for cell selection or reselection, wherein the radio frequency condition experienced by the user equipment on the cell comprises RSRP experienced by the user equipment on the cell, or a reference signal received quality (RSRQ) threshold that is greater than a RSRQ threshold for cell selection or reselection, wherein the radio frequency condition experienced by the user equipment on the cell comprises RSRQ experienced by the user equipment on the cell; and prevent the access by the user equipment to the cell for a type of access attempt corresponding to the access category based on the access barring requirement being met.

2. The user equipment of claim 1, wherein the base station experiences congestion on a physical downlink control channel of the cell.

3. The user equipment of claim 1, wherein the at least one memory and the computer code are configured, with the at least one processor, to cause the user equipment at least to:

receive, from the base station, the radio frequency conditions threshold.

4. The user equipment of claim 3, wherein the at least one memory and the computer code are configured, with the at least one processor, to cause the user equipment at least to: receive, from the base station, the radio frequency conditions threshold in a system information block.

5. The user equipment of claim 4, wherein the system information block is an SIB1, an SIB2 or an SIB25.

6. The user equipment of claim 5, wherein the system information block is an SIB1 when the base station serving the cell is a gNode B and is connected to a 5G core network.

7. The user equipment of claim 5, wherein the system information block is an SIB25 when the base station serving the cell is an eNode B and is connected to a 5G core network.

8. The user equipment of claim 1, wherein the radio frequency conditions threshold is defined at a unified access control barring configuration level.

9. The user equipment of claim 1, wherein the radio frequency conditions threshold is defined at a unified access control barring for common level.

10. The user equipment of claim 1, wherein the radio frequency conditions threshold is defined at a unified access control barring per public land mobile network configuration level.

11. A method comprising:

determining that an access by a user equipment to a cell served by a base station is required;

determining that an access barring requirement associated with an access category to which the user equipment belongs is met by the user equipment, wherein the access category is one of a plurality of access categories, and the plurality of access categories correspond to different types of access attempts, wherein determining that the access barring requirement is met comprises determining that a radio frequency condition experienced by the user equipment on the cell is lower than a radio frequency conditions threshold that is a condition related to the user equipment for the access category, and wherein the radio frequency conditions threshold is one of:

a reference signal received power (RSRP) threshold that is greater than a RSRP threshold for cell selection or reselection, wherein the radio frequency condition experienced by the user equipment on the cell comprises RSRP experienced by the user equipment on the cell, or a reference signal received quality (RSRQ) threshold that is greater than a RSRQ threshold for cell selection or reselection, wherein the radio frequency condition experienced by the user equipment on the cell comprises RSRQ experienced by the user equipment on the cell; and preventing the access by the user equipment to the cell for a type of access attempt corresponding to the access category based on the access barring requirement being met.

* * * * *